(12) United States Patent
Kiiski et al.

(10) Patent No.: US 12,098,339 B2
(45) Date of Patent: Sep. 24, 2024

(54) DIESEL FUEL COMPOSITION (71) Applicant: Neste Oyj, Espoo (FI)

(72) Inventors: Ulla Kiiski, Porvoo (FI); Jenni Nortio, Porvoo (FI); Markku Kuronen, Porvoo (FI)

(73) Assignee: NESTE OYJ, Espoo (FI)

(*) Notice: Subject to any disclaimer, the term of this patent is extended or adjusted under 35 U.S.C. 154(b) by 39 days.

(21) Appl. No.: 17/602,186

(22) PCT Filed: Apr. 7, 2020

(86) PCT No.: PCT/FI2020/050224
§ 371 (c)(1),
(2) Date: Oct. 7, 2021

(87) PCT Pub. No.: WO2020/208299
PCT Pub. Date: Oct. 15, 2020

(65) Prior Publication Data
US 2022/0145196 A1 May 12, 2022

(30) Foreign Application Priority Data
Apr. 10, 2019 (FI) .................... 20195288

(51) Int. Cl.
C10L 1/16 (2006.01)
C10L 1/02 (2006.01)
C10L 1/19 (2006.01)

(52) U.S. Cl.
CPC .......... C10L 1/1691 (2013.01); C10L 1/026 (2013.01); C10L 1/19 (2013.01);
(Continued)

(58) Field of Classification Search
CPC .......... C10L 1/1691; C10L 1/026; C10L 1/19; C10L 2200/0446; C10L 2230/081;
(Continued)

(56) References Cited

U.S. PATENT DOCUMENTS

2004/0128905 A1 7/2004 Clark et al.
2008/0127550 A1* 6/2008 Li ..................... C10L 1/026
44/307
(Continued)

FOREIGN PATENT DOCUMENTS

EP 2371931 A1 10/2011
JP 2007016089 A 1/2007
(Continued)

OTHER PUBLICATIONS

AMF-Advanced Motor Fuels, Fuel Information>Bio/synthetic diesel (paraffins>Properties, In: [online], 2014, retrieved Sep. 7, 2019 from https://www.iea-amf.org/content/fuel_information/paraffins/properties>, Energy Technology Network. (12 pages).
(Continued)

Primary Examiner — Cephia D Toomer
(74) Attorney, Agent, or Firm — Buchanan Ingersoll & Rooney PC (57) ABSTRACT A diesel fuel composition as disclosed includes a fossil diesel component, a fatty acid methyl esters component, and a hydrotreated renewable paraffinic diesel component. A method is disclosed for producing the diesel composition and use thereof. Use of the hydrotreated renewable paraffinic diesel component as an oxidation stability improver is further disclosed.

27 Claims, 1 Drawing Sheet (52) U.S. Cl.
CPC . *C10L 2200/0446* (2013.01); *C10L 2230/081* (2013.01); *C10L 2270/026* (2013.01)

(58) Field of Classification Search
CPC ....... C10L 2270/026; C10L 2200/0469; C10L 2200/0476; C10L 1/10; C10L 1/1832; C10L 1/02; C10L 1/16; Y02E 50/10
See application file for complete search history.

(56) References Cited

U.S. PATENT DOCUMENTS

| | | | |
|---|---|---|---|
| 2008/0163542 A1* | 7/2008 | Krupa | C10L 1/02 44/308 |
| 2008/0312480 A1* | 12/2008 | Dindi | B01J 29/06 585/240 |
| 2011/0232169 A1 | 9/2011 | Cherrillo et al. | |
| 2013/0333652 A1 | 12/2013 | Trewella et al. | |
| 2015/0368576 A1 | 12/2015 | Boonwatsakul et al. | |
| 2018/0216021 A1 | 8/2018 | Kuronen et al. | |
| 2018/0237710 A1 | 8/2018 | Freer et al. | |

FOREIGN PATENT DOCUMENTS

| | | | | |
|---|---|---|---|---|
| WO | 2011073780 A1 | 6/2011 | | |
| WO | WO-2018037163 A1 * | 3/2018 | | C10G 3/42 |
| WO | 2019038481 A1 | 2/2019 | | |

OTHER PUBLICATIONS

Finnish Office Action issued in corresponding Finnish Patent Application No. 20195288 by the Finnish Patent and Registration Office dated Nov. 20, 2019. (9 pages).

Written Opinion of the International Preliminary Examining Authority (PCT/IPEA/408) issued in corresponding International Patent Application No. PCT/FI2020/050224 dated Feb. 25, 2021. (4 pages).
International Preliminary Report on Patentability (PCT/IPEA/409) issued in corresponding International Patent Application No. PCT/FI2020/050224 dated May 25, 2021. (15 pages).
International Search Report (PCT/ISA/210) and Written Opinion (PCT/ISA/237) mailed on Jun. 17, 2020, by the European Patent Office as the International Searching Authority for International Application No. PCT/FI2020/050224. (10 pages).
Lapuerta, Magín, et al., "Blending scenarios for soybean oil derived biofuels with conventional diesel", Biomass & Bioenergy, SciVerse ScienceDirect, Accepted Dec. 5, 2012, pp. 74-85, vol. 49, Elsevier Ltd. (12 pages).
Labeckas, Gvidonas, et al., "The individual effects of cetane number, oxygen content or fuel properties on the ignition delay, combustion characteristics, and cyclic variation of a turbocharged CRDI diesel engine—Part 1", Energy Conversion and Management, Accepted Jun. 16, 2017, pp. 1003-1027, vol. 148, Elsevier Ltd. (25 pages).
De Goede, S., et al., "A Comparison of the Stability Performance of Blends of Paraffinic Diesel and Petroleum-Derived Diesel, with RME Biodiesel Using Laboratory Stability Measurement Techniques", Journal of Fuels, Accepted Jan. 23, 2015, pp. 1-15, vol. 2015, Article ID 528497, Hindawi Publishing Corporation. (16 pages).
Safety Data Sheet (SDS), "Section 1—Chemical Product and Company Identification", SDS402-US, Version Sep. 29, 2018, from <https://www.reg.com/docs/default-source/safetydatasheets/renewable-hydrocarbon-diesel-sds-402-us-20180929.pdf?sfvrsn+51148c87_2>. (9 pages).
Office Action (Opinion on Patentability) issued on Feb. 2, 2022, by the Finnish Patent and Registration Office in corresponding Finnish Patent Application No. 20195288. (6 pages).
R. Dunn, "Antioxidants for Improving Storage Stability of Biodiesel", Biofpr, Jun. 13, 2008, pp. 304-318.

\* cited by examiner

DIESEL FUEL COMPOSITION

TECHNICAL FIELD

The present invention generally relates to a diesel fuel composition. The invention relates particularly, though not exclusively, to a diesel fuel composition comprising a fossil diesel component, a hydrotreated renewable paraffinic diesel component and a fatty acid methyl esters (FAME) component, the diesel fuel composition having beneficial oxidation stability properties. Further, the invention relates, though not exclusively, to use of a hydrotreated renewable paraffinic diesel component as a oxidation stability improver.

BACKGROUND ART

This section illustrates useful background information without admission of any technique described herein representative of the state of the art.

Environmental considerations have in recent years impacted the fuel industry, which has traditionally relied on fuels of fossil origin. New fuels and fuel blending components of renewable origin have been introduced as more sustainable alternatives to fossil diesel.

One such renewable component is biodiesel (fatty acid methyl esters, FAME). Biodiesel can be used as a blending component in diesel fuel compositions. However, biodiesel have certain drawbacks and current diesel fuel standards (EN 590:2017) restrict the amount of biodiesel to a maximum of 7 vol-%. One of the drawbacks of biodiesel is its poor oxidation stability without antioxidant. Concawe recommends a storage time maximum of 6 months for biodiesel and present blends thereof. Blending biodiesel with fossil diesel produces blends with inferior oxidation stability compared to neat fossil diesel. Oxidation stability is used for assessing long term storage stability characteristics of diesel fuels. Good oxidation stability allows long-term storage of diesel fuels and ensures problem free use of diesel fuels even after long-term storage.

SUMMARY

An object of the present invention is to improve the oxidation stability of diesel fuel compositions comprising fatty acid methyl esters (FAME) and fossil diesel.

According to a first aspect of the invention there is provided a diesel fuel composition comprising:
a. a fossil diesel component at least 20 vol-%, or 20-68 vol-%, of the total diesel fuel composition volume;
b. a fatty acid methyl esters (FAME) component 2-10 vol-% of the total diesel fuel composition volume; and
c. a hydrotreated renewable paraffinic diesel component 30-70 vol-% of the total diesel fuel composition volume.

It has surprisingly been found that incorporation of a hydrotreated renewable paraffinic diesel component to diesel fuel compositions comprising a FAME component and a fossil diesel component improves the oxidation stability of the diesel fuel composition. Surprisingly, diesel fuel compositions of the present invention comprising 30-70 vol-% hydrotreated renewable paraffinic diesel component of the total diesel fuel composition volume have better oxidation stability than neat hydrotreated renewable paraffinic diesel component and diesel fuel compositions of the FAME component and the fossil diesel component.

In certain embodiments, the diesel fuel composition comprises hydrotreated renewable paraffinic diesel component 30-60 vol-%, preferably 30-50 vol-%, of the total diesel fuel composition volume. It has been found that diesel fuel compositions according to the first aspect comprising approximately 50 vol-% hydrotreated renewable paraffinic diesel component have particularly beneficial oxidation stability properties.

In certain embodiments, the diesel fuel composition comprises approximately 7 vol-% FAME component of the total diesel fuel composition volume. Diesel fuel standard EN 590:2017 allows up to 7 vol-% FAME in diesel fuels. Thus, diesel fuel compositions comprising approximately 7 vol-% FAME maximizes the amount of the renewable FAME component without violating the requirements of EN 590:2017.

In certain embodiments, the diesel fuel composition comprises fossil diesel component 30-68 vol-%, preferably 40-68 vol-%, of the total diesel fuel composition volume. The vol-% fossil diesel component may be selected based on the vol-% of FAME component and hydrotreated renewable paraffinic diesel component so that the total amount of the fossil diesel fuel component, the FAME component, and the hydrotreated renewable paraffinic diesel component does not exceed 100 vol-%.

In certain embodiments, the total amount of a., b. and c. is at least 99 vol-% of the total diesel fuel composition volume. The beneficial oxidation stability properties of the diesel fuel composition are favored, when the diesel fuel composition comprises mainly fossil diesel component, FAME component, and hydrotreated renewable paraffinic diesel component. Further, such diesel fuel compositions perform very well as automotive diesel fuels and as heating oils.

In certain embodiments, the diesel fuel composition comprises antioxidant, preferably 10-1000 ppm by weight, preferably 70 ppm by weigh. Surprisingly, antioxidant comprised in the diesel fuel composition provides a synergetic effect improving together with the hydrotreated renewable paraffinic diesel component the oxidation stability of the diesel fuel composition much more than can be expected based on the oxidation stability of diesel fuel compositions of the fossil diesel component and the FAME component additized with antioxidant and on the oxidation stability of neat hydrotreated renewable paraffin component.

In certain embodiments, the hydrotreated renewable paraffinic diesel component comprises paraffins at least 90 wt-%, preferably at least 95 wt-%, more preferably at least 98 wt-%, even more preferably at least 99 wt-% of the total weight of the renewable paraffinic diesel component. A high paraffin content of the hydrotreated renewable paraffinic diesel component promotes beneficial oxidation stability properties of the diesel fuel composition.

In certain embodiments, the hydrotreated renewable paraffinic diesel component comprises naphthenes at most 5.0 wt-%, preferably at most 2.0 wt-%, of the total weight of the hydrotreated renewable paraffinic diesel component.

In certain embodiments, the hydrotreated renewable paraffinic diesel component comprises paraffins in the range of carbon number C15-C18 at least 70 wt-%, preferably at least 80 wt-%, more preferably at least 90 wt-% of the total weight of paraffins in the hydrotreated renewable paraffinic diesel component. This carbon number distribution is typical for hydrotreated renewable paraffinic diesel components.

In certain embodiments, the hydrotreated renewable paraffinic diesel component comprises i-paraffins and n-paraffins in a weight ratio of i-paraffins to n-paraffins of at least 2.2, at least 2,3, at least 3, or at least 4. Hydrotreated renewable paraffinic diesel components comprising i-paraffins and n-paraffins in a weight ratio of i-paraffins to n-paraffins of at least 2.2 have beneficial cold properties. The cold properties improve as the weight ratio of i-paraffins to n-paraffins increases.

In certain embodiments, the fossil diesel component is fossil middle distillate originating from non-renewable sources and having a boiling point in the range from 150° C. to 400° C., preferably from 180 to 360° C., preferably as measured according to EN-ISO-3405:2011.

In certain embodiments, the fossil diesel component comprises 10-50 wt-% naphthenics, less than 45 wt-% aromatics, and 10-70 wt-% paraffins of the total weight of the fossil diesel component.

Surprisingly it was observed that the hydrotreated renewable paraffinic component and antioxidant together improved in a synergistic way the oxidation stability of a diesel fuel composition comprising fossil diesel and FAME. Thus, fossil diesel can be partially replaced in the diesel fuel composition by hydrotreated renewable paraffinic component and achieve improved oxidation stability and storage stability of diesel fuel composition.

According to a second aspect of the invention, there is provided a method for producing a diesel fuel composition, comprising:
providing a fossil diesel component;
providing a hydrotreated renewable paraffinic diesel component;
providing a fatty acid methyl esters (FAME) component; and
mixing the fossil diesel component, the hydrotreated renewable paraffinic diesel component, and the FAME component with each other to form a diesel fuel composition comprising, based on the total diesel fuel composition volume, at least 20 vol-%, or 20-68 vol-%, fossil diesel component; 30-70 vol-% hydrotreated renewable paraffinic diesel component; and 2-10 vol-% FAME component.

Diesel fuel compositions formed according to the method of the second aspect have a favourable oxidation stability. Surprisingly, diesel fuel compositions formed according to the method of the second aspect comprising 30-70 vol-% hydrotreated renewable paraffinic diesel component have better oxidation stability than neat hydrotreated renewable paraffinic diesel component and diesel fuel compositions of the FAME component and the fossil diesel component.

In certain embodiments, providing a hydrotreated renewable paraffinic diesel component comprises:
i. providing a feedstock originating from renewable sources, the feedstock comprising fatty acids, or fatty acid derivatives, or triglycerides, or a combination thereof;
ii. subjecting the feedstock to hydrotreatment, preferably hydrodeoxygenation, to produce n-paraffins; and optionally
iii. subjecting at least a portion of the n-paraffins from step ii) to an isomerisation treatment to produce i-paraffins.

In certain embodiments, the method comprises providing an antioxidant; and mixing the antioxidant with the fossil diesel component, the renewable paraffinic diesel component, and the FAME component to form a diesel fuel composition comprising 10-1000 ppm by weight antioxidant.

In certain embodiments, the method comprises providing a FAME component comprising 10-5000 ppm by weight, preferably 1000 ppm by weight, antioxidant.

According to a third aspect of the invention there is provided use of a diesel fuel composition according to the first aspect as a fuel for a diesel engine.

According to a fourth aspect of the invention there is provided use of a diesel fuel composition according to the first aspect as a heating oil.

According to a fifth aspect of the invention there is provided use of a hydrotreated renewable paraffinic diesel component as an oxidation stability improver for a fuel composition comprising a fossil diesel component and a fatty acid methyl esters (FAME) component.

According to a sixth aspect there is provided a method for improving the oxidation stability of a fuel composition comprising a fossil diesel component and a fatty acid methyl esters (FAME) component, the method comprising adding a hydrotreated renewable paraffinic diesel component to said fuel composition.

It has surprisingly been found that the oxidation stability of fuel compositions comprising a fossil diesel component and a FAME component can be improved by incorporation of a hydrotreated renewable paraffinic diesel component to said fuel compositions.

In certain embodiments, the hydrotreated renewable paraffinic diesel component is added to the fuel composition to form a combined fuel composition comprising 30-70 vol-%, preferably 30-60 vol-%, more preferably 30-50 vol-% hydrotreated renewable paraffinic diesel component of the total volume of the combined fuel composition. Such vol-% hydrotreated renewable paraffinic diesel component provide the formed combined fuel compositions with particularly beneficial oxidation stability properties.

In certain embodiments, the combined fuel composition comprises 2-10 vol-%, preferably approximately 7 vol-%, FAME component of the total combined fuel composition volume.

In certain embodiments, the total amount of hydrotreated renewable paraffinic diesel component, fossil diesel component, and FAME component in the combined fuel composition is at least 99 vol-% of the total volume of the combined fuel composition.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

Some example embodiments of the invention will be described with reference to the accompanying drawings, in which.

DETAILED DESCRIPTION

The present invention provides a diesel fuel composition with beneficial oxidation stability properties, the diesel fuel composition comprising a fossil diesel component, a fatty acid methyl esters (FAME) component, and a hydrotreated renewable paraffinic diesel component. Beneficial oxidation stability properties or good oxidation stability means herein a high oxidation stability value as measured according to EN 16091:2011 "Liquid petroleum products—Middle distillates and fatty acid methyl ester (FAME) fuels and blends—Determination of oxidation stability by rapid small scale oxidation method" (PetroOXY), preferably PetroOXY oxidation stabilities above 60 min, such as at least 65 min. Further, beneficial oxidation stability properties or good oxidation stability may also refer herein to an increase in the PetroOXY oxidation stability value. Improved oxidation stability refers herein to an increase in the PetroOXY value. It has been found that for diesel fuel compositions comprising more than 2 vol-% FAME of the total diesel fuel composition volume, there is a correlation between oxidation stability values measured according to PetroOXY (EN 16091:2011) and according to Rancimat (EN 15751:2014). Measured Rancimat values of 20 h corresponds approximately to measured PetroOXY values of 54-62 min.

The diesel fuel composition according to the present invention comprises at least 20 vol-%, or 20-68 vol-%, fossil diesel component, 2-10 vol-% FAME component, and 30-70 vol-% hydrotreated renewable paraffinic diesel component of the total diesel fuel composition volume. It has surprisingly been found that diesel fuel compositions comprising a hydrotreated renewable paraffinic diesel component, a FAME component, and a fossil diesel component have improved oxidation stability compared to diesel fuel compositions of the FAME component and the fossil diesel component. Improving the oxidation stability by incorporation of a hydrotreated renewable paraffinic diesel component increases the vol-% of renewable components in the diesel fuel compositions, which increases the environmental sustainability of the diesel fuel composition.

Surprisingly, diesel fuel compositions of the present invention comprising, based on the total diesel fuel composition volume, 30-70 vol-% hydrotreated renewable paraffinic diesel component have a higher PetroOXY oxidation stability than components of the diesel fuel composition, namely neat hydrotreated renewable paraffinic diesel component and diesel fuel compositions of the FAME component and the fossil diesel component.

It has been found that diesel fuel compositions comprising approximately 50 vol-% hydrotreated renewable paraffinic diesel component have particularly beneficial oxidation stability properties. Accordingly, in certain embodiments, the diesel fuel composition comprises, based on the total diesel fuel composition volume, 2-10 vol-% FAME component, 30-68 vol-% fossil diesel component and 30-60 vol-% hydrotreated renewable paraffinic diesel component. Further, in certain embodiments, the diesel fuel composition comprises, based on the total fuel composition volume, 2-10 vol-% FAME component, 40-68 vol-% fossil diesel component, and 30-50 vol-% hydrotreated renewable paraffinic diesel component.

Standard EN 590:2017 allows a maximum of 7 vol-% FAME in diesel fuels. Thus, to provide a diesel fuel composition according to EN 590:2017, in certain embodiments, the diesel composition comprises 7 vol-% FAME component, and: 23-63 vol-% fossil diesel component and 30-70 vol-% hydrotreated renewable paraffinic diesel component; preferably 33-63 vol-% fossil diesel component and 30-60 vol-% hydrotreated renewable paraffinic diesel component; more preferably 43-63 vol-% fossil diesel component and 30-50 vol-% hydrotreated renewable paraffinic diesel component of the total diesel fuel composition volume.

Preferably, the diesel fuel composition consists mainly of the fossil diesel component, the FAME component, and the hydrotreated renewable paraffinic diesel component. Such diesel fuel compositions have beneficial oxidation stability, and perform very well as automotive diesel fuels and as heating oils. Therefore, in any of the embodiments disclosed herein, the total amount of the fossil diesel component, the FAME component, and the hydrotreated renewable paraffinic diesel component may be at least 99 vol-% of the total diesel fuel composition volume. Total amount refers herein to the sum of the vol-% amounts.

For example, in certain embodiments, the diesel fuel composition comprises, based on the total diesel fuel composition volume, 2-10 vol-% FAME component, 30-70 vol-%, preferably 30-60 vol-%, more preferably 30-50 vol-% hydrotreated renewable paraffinic diesel component, and fossil diesel component in an amount such that the total amount of the FAME component, the hydrotreated renewable paraffinic diesel component, and the fossil diesel component is at least 99 vol-%. In one embodiment such a diesel fuel composition comprises at least 20 vol-% fossil diesel composition.

Further, in certain embodiments, the diesel fuel composition comprises, based on the total diesel fuel composition volume, approximately 7 vol-% FAME component, 30-70 vol-%, preferably 30-60 vol-%, more preferably 30-50 vol-% hydrotreated renewable paraffinic diesel component, and fossil diesel component in an amount such that the total amount of the FAME component, the hydrotreated renewable paraffinic diesel component, and the fossil diesel component is at least 99 vol-%. The margin of error of approximately 7 vol-% FAME component is ±0.5 vol-%.

In an embodiment the fossil diesel component comprises at least about 20 vol-% of the total diesel fuel composition volume.

In an embodiment the fatty acid methyl esters component comprises about 2-10 vol-% of the total diesel fuel composition volume.

In an embodiment the hydrotreated renewable paraffinic diesel component comprises about 30-70 vol-% of the total diesel fuel composition volume.

The diesel fuel composition may contain refinery and performance additives such as lubricity, cold flow, antistatic and detergent additives. Preferably, the amount of such additives is 1 vol-% or less of the total diesel fuel composition volume. Particularly, the diesel fuel composition may comprise antioxidant. Antioxidant comprised in the diesel fuel composition of the present invention provides a synergetic effect improving together with the hydrotreated renewable paraffinic diesel component the oxidation stability of the diesel fuel composition more than can be expected based on the oxidation stability of diesel fuel compositions of the fossil diesel component and the FAME component additized with antioxidant and on the oxidation stability of neat hydrotreated renewable paraffin component. It has surprisingly been found that increasing the vol-% of the hydrotreated renewable paraffinic diesel component, particularly from 30 vol-% to 50 vol-%, in the diesel fuel composition while keeping the concentration of antioxidant in the diesel fuel composition constant significantly improves the oxidation stability of the diesel fuel composition, thus demonstrating said synergetic effect. Accordingly, in certain embodiments, the diesel fuel composition comprises antioxidant, preferably 10-1000 ppm by weight. The antioxidant may be for example 2,6-di-tert-butyl-4-hydroxytoluene (BHT). However, any suitable antioxidant may be used. In certain embodiments, the diesel fuel composition comprises 70 ppm by weight antioxidant. Diesel fuel compositions of the present invention comprising 70 ppm by weight antioxidant have been found to have a PetroOXY oxidation stability of 105 min or more. Optionally, in certain other embodiments, the diesel fuel composition is a diesel fuel composition without antioxidant additives.

It has been found that increasing the amount of the renewable paraffinic diesel component in the diesel fuel composition from 30 vol-% to 50 vol-% improves the oxidation stability of the diesel fuel composition. Therefore, in certain embodiments, the diesel fuel composition comprises 2-10 vol-%, preferably 7 vol-%, FAME component, 40-60 vol-% renewable paraffinic diesel component, and 30-58 vol-% fossil diesel component of the total diesel fuel composition volume.

The hydrotreated renewable paraffinic diesel component comprised in the diesel fuel composition of the present invention is a component derived from a renewable source or renewable sources through hydrotreatment and comprising to a large extent paraffins (alkanes). The hydrotreatment is optionally followed by an isomerisation treatment, i.e the hydrotreated renewable paraffinic diesel component may be obtained from hydrotreatment followed by isomerisation. Hydrotreated renewable paraffinic diesel components obtained from hydrotreatment followed by isomerisation can be used as the hydrotreated renewable paraffinic diesel component in any aspect and embodiment of the present invention. Preferably, the renewable sources from which the hydrotreated renewable paraffinic diesel component is derived are renewable oils, renewable fats, or a combination thereof.

Chemically hydrotreated renewable oils and/or fats are mixtures of mainly acyclic paraffinic hydrocarbons (normal paraffins, n-paraffins, and isoparaffins, i-paraffins) comprising a very low quantity of sulphur and aromatics. Accordingly, in certain embodiments, the hydrotreated renewable paraffinic diesel component comprises at most 1.0 wt-%, preferably at most 0.5 wt-%, more preferably at most 0.2 wt-% aromatics of the total weight of the hydrotreated renewable paraffinic diesel component. Further, in certain embodiments, the hydrotreated renewable paraffinic diesel component is a low-sulphur diesel component comprising sulphur less than 5 ppm by weigh (parts per million by weight). Hydrotreated renewable paraffinic diesel components with a low sulphur content and/or a low aromatics content burn cleaner reducing harmful emissions, such as soot emissions.

The hydrotreated renewable paraffinic diesel component is suitable for use as diesel engine fuel or heating oil as such, or, for example, after additization with refinery and performance additives such as lubricity, cold flow, antistatic and detergent additives. The hydrotreated renewable paraffinic diesel components may also be referred to as "bio-based paraffinic diesel component", "hydrotreated vegetable oil fuel", "hydrotreated vegetable oil", "hydrotreated renewable diesel", "renewable fuel", "renewable diesel", or "renewable diesel component".

Benefits of the hydrotreated renewable paraffinic diesel component include a reduction of harmful emissions (due to the low content, or lack of, aromatics and sulphur) and a high cetane number. In certain embodiments, the diesel fuel composition comprises 2-10 vol-% FAME component, and: 50-70 vol-% hydrotreated renewable paraffinic diesel component and 20-48 vol-% fossil diesel component; preferably 60-70 vol-% hydrotreated renewable paraffinic diesel component and 20-38 vol-% fossil diesel component of the total diesel fuel composition volume. Said diesel fuel compositions have good oxidation stability, i.e. a PertoOXY oxidation stability above the PetroOXY stability of neat hydrotreated renewable paraffinic diesel component and of diesel fuel compositions of the FAME component and the fossil diesel component.

Hydrotreatment and optional isomerisation of renewable oils and/or fats typically produces bio-based middle distillate fuels. In certain embodiments, the hydrotreated renewable paraffinic diesel component is a renewable middle distillate fuel having a boiling point range (initial boiling point to end point) as measured according to EN-ISO-3405: 2011 within the temperature range 180-360° C., preferably 180-320° C. These renewable middle distillate fuels perform well as diesel fuels and as heating oils.

In certain embodiments, the hydrotreated renewable paraffinic diesel component is a diesel fuel from hydrotreatment according to standard EN 15940:2016. Table 1 shows some properties of EN 15940:2016 fuels. Hydrotreated renewable paraffinic diesel components according to EN 15940:2016 class A perform particularly well as diesel fuels.

TABLE 1

Some properties of EN 15940:2016 class A diesel fuels.

| Property | | Unit |
|---|---|---|
| Cetane number | ≥70.0 | |
| Density at 15° C. | 765.0 ... 800.0 | kg/m$^3$ |
| Total aromatics | ≤1.1 | wt-% |
| Sulphur | ≤5.0 | mg/kg |
| Flash point | >55 | ° C. |
| Distillation 95 vol-% | ≤360 | ° C. |
| Viscosity at 40° C. | 2.000 ... 4.500 | mm$^2$/s |

In certain embodiments, the hydrotreated renewable paraffinic diesel component comprises at least 90 wt-%, preferably at least 95 wt-%, more preferably at least 98 wt-%, even more preferably 99 wt-% paraffins of the total weight of the hydrotreated renewable paraffinic diesel component. The hydrotreated renewable paraffinic diesel component may comprise at least 91 wt-%, 92 wt-%, 93 wt-%, 94 wt-%, 96 wt-%, or 97 wt-% paraffins based on the total weight of the hydrotreated renewable paraffinic diesel component. In certain embodiments, the hydrotreated renewable paraffinic diesel component has a low olefin (alkene) content and comprises less than 2.0 wt-%, preferably at most 1.0 wt-%, olefins of the total weight of the hydrotreated renewable paraffinic diesel component. Further, the hydrotreated renewable paraffinic diesel component has preferably a low content of naphthenes (cycloalkanes) and accordingly, comprises preferably at most 5.0 wt-%, preferably at most 2.0 wt-% naphthenes of the total weight of the hydrotreated renewable paraffinic diesel component. Hydrotreated renewable paraffinic diesel components with a high paraffin content are stable and favour beneficial oxidation stability properties of the diesel fuel composition.

In certain embodiments, the hydrotreated renewable paraffinic diesel component comprises at least 70 wt-%, preferably at least 80 wt-%, such as at least 88 wt-%, more preferably at least 90 wt-% paraffins in the range of carbon number C15-C18 of the total weight of the paraffins in the hydrotreated renewable paraffinic diesel component. Optionally, in certain embodiments, the hydrotreated renewable paraffinic diesel component comprises paraffins in the range of carbon number C3-C14 less than 25 wt-%, such as less than 20 wt-%, or less than 10% wt-%, or preferable less than 7 wt-% of the total weight of paraffins in the hydrotreated renewable paraffinic diesel component. Optionally, in certain embodiments, the hydrotreated renewable paraffinic diesel component comprises paraffins in the range of carbon number C19-C24 less than 25 wt-%, such as less than 20 wt-%, or less than 10 wt-%, preferably less than 5 wt-% of the total weight of paraffins in the hydrotreated renewable paraffinic diesel component. Characteristics of the diesel fuel composition, in particular the carbon number distribution of the paraffins, can be determined by methods known in the art, such as by gas chromatography.

The above carbon number distributions are typical for hydrotreated renewable paraffinic diesel components derived through hydrotreatment of renewable feedstock, such as renewable oils and/or fats. Fuel components manufactured through gas-to-liquid (GTL) processes, such as processes comprising a Fischer-Tropsch process step, have a much broader distribution of paraffinic hydrocarbons (paraffins) compared to the above-described carbon number distributions. GTL-fuels are characterized by broad distribution of paraffinic hydrocarbons in the range C9-C24, which makes the GTL-fuels chemically different when compared to the present hydrotreated renewable paraffinic component. The hydrotreated renewable paraffinic diesel component is obtained without gasification.

In certain embodiments, the hydrotreated renewable paraffinic diesel component comprises at least 95 wt-% paraffins of the total weight of the hydrotreated renewable paraffinic diesel component, and at least 70 wt-%, preferably at least 80 wt-%, more preferably at least 90 wt-%, of said paraffins are in the range of carbon number C15-C18 based on the total weight of paraffins in the hydrotreated renewable paraffinic diesel component. Further, in certain embodiments, the hydrotreated renewable paraffinic diesel component comprises at least 99 wt-% paraffins of the total weight of the hydrotreated renewable paraffinic diesel component, and at least 70 wt-%, preferably at least 80 wt-%, more preferably at least 90 wt-%, of said paraffins are in the range of carbon number C15-C18 based on the total weight of paraffins in the hydrotreated renewable paraffinic diesel component. Such hydrotreated renewable paraffinic diesel components are stable and perform well as diesel fuel components.

The paraffins of the hydrotreated renewable paraffinic diesel component may comprise both isoparaffins (i-paraffins) and normal paraffins (n-paraffins). Isoparaffins improve the cold properties, i.e. lower the cloud point, the cold filter plugging point or the pour point, of the hydrotreated renewable paraffinic diesel component. Accordingly, in certain embodiments, the weight ratio of i-paraffins to n-paraffins in the hydrotreated renewable paraffinic diesel component is at least 2.2. Increasing the weight ratio of i-paraffins to n-paraffins further improves the cold properties of the hydrotreated renewable paraffinic diesel component. Good cold properties are beneficial with regard to use and/or storage of the fuel at low ambient temperatures. In certain embodiments, the weight ratio of i-paraffins to n-paraffins in the hydrotreated renewable paraffinic diesel component is at least 2.3, preferably at least 3, more preferably at least 4. The weight ratio of i-paraffins to n-paraffins in the hydrotreated renewable paraffinic diesel component may be about 2.2, 2.3, 2.4, 2.5, 2.6, 10 2.7, 2.8, 2.9, 3, 4, 5, 6, 7, 8, 9 or 10. A hydrotreated renewable paraffinic diesel component comprising both n-paraffins and i-paraffins can be used in any aspect and embodiment of the present invention.

In certain embodiments, the hydrotreated renewable paraffinic diesel component comprises at least 90 wt-%, preferably at least 95 wt-%, more preferably at least 99 wt-% paraffins of the total weight of the hydrotreated renewable paraffinic diesel component, and of said paraffins at least 80 wt-%, based on the total weight paraffins in the hydrotreated renewable paraffinic diesel component, are in the in the range of carbon number C15-C18, and the weight ratio of i-paraffins to n-paraffins in the hydrotreated renewable paraffinic diesel component is at least 2.2. Further, in certain embodiments, the hydrotreated renewable paraffinic diesel component comprises at least 90 wt-%, preferably at least 95 wt-%, more preferably at least 99 wt-% paraffins, and of said paraffins, based on the total weight of paraffins in the hydrotreated renewable paraffinic diesel component, at least 90 wt-% are in the range of carbon number C15-C18, and the weight ratio of i-paraffins to n-paraffins in the hydrotreated renewable paraffinic diesel component is at least 2.2. Such hydrotreated renewable paraffinic diesel components are stable, have good cold properties, and perform well as diesel fuel components.

The hydrotreated renewable paraffinic diesel component described in the foregoing may be provided as the hydrotreated renewable paraffinic diesel component in any aspect and embodiment of the present invention.

Carbon atoms of renewable origin comprise a higher number of $^{14}$C isotopes compared to carbon atoms of fossil origin. Therefore, it is possible to distinguish from the diesel fuel composition organic compounds of renewable origin and non-renewable organic compounds by analysing the ratio of $^{12}$C and $^{14}$C isotopes. Thus, a particular ratio of said isotopes can be used as a "tag" to identify renewable organic compounds and differentiate them from non-renewable organic compounds. The isotope ratio does not change in the course of chemical reactions, such as in hydrotreating and isomerisation processes. The $^{14}$C isotope content is a measurable and quantifiable feature which can be determined for example by standardised methods, such as ASTM D 6866 or DIN 51637. In a composition comprising both renewable material and fossil material, the percentage of renewable carbon in the composition can be quantified. The nature and origin of diesel components and diesel fuels can thus be confirmed and distinguished by $^{14}$C analysis.

The fossil diesel component comprised in the diesel fuel composition of the present invention is a component or composition, which is naturally occurring and derived from non-renewable sources. Such non-renewable sources may also be referred to as "fossil sources" or "mineral sources". Examples of non-renewable sources, from which the fossil diesel component may be derived, include crude oil, petroleum oil/gas, shale oil/gas, natural gas, or coal deposits, and the like, and combinations thereof, including any hydrocarbon-rich deposits that can be utilized from ground/underground sources. Such sources may also be referred to as "fossil oil". The term fossil also refers to recycling material originating from non-renewable sources.

In certain embodiments, the fossil diesel component is fossil middle distillate, preferably fossil diesel fuel. Fossil diesel fuel may also be called, for example, "petrodiesel", "mineral diesel", or "petroleum distillate". The fossil diesel component may comprise atmospheric or vacuum distillates. The distillates may comprise cracked gas oil or a blend of any proportion of straight run or thermally or catalytically cracked distillates. The distillates may be subjected to further processing, such as hydrogen-treatment, or other processes to improve their properties as diesel fuels. Also, the fossil diesel component may include refinery and performance additives such as lubricity, cold flow, antistatic and detergent additives.

In certain embodiments, the fossil diesel component has a boiling point range (initial boiling point to end point) as measured according to EN-ISO-3405:2011 within the temperature range 150-400° C., preferably 180-360° C. The fossil diesel component may be a low-sulphur diesel component comprising sulphur at most 50 ppm by weight, preferably at most 10 ppm by weight.

In certain embodiments, the fossil diesel component meets the requirements of standard EN590:2017 for diesel fuels, i.e. the fossil diesel component is a (automotive) diesel fuel according to EN590:2017 originating from non-renewable sources. Table 2 shows some properties of EN590:2017 diesel fuels.

TABLE 2

Some properties of EN590:2017 diesel fuels.

| Property | | Unit |
|---|---|---|
| Cetane number | ≥51.0 | |
| Density at 15° C. | 800.0 ... 845.0 | kg/m$^3$ |
| Polyaromatics | ≤8.0 | wt-% |
| Sulphur | ≤10.0 | mg/kg |
| Flash point | >55 | ° C. |
| Distillation 95 vol-% | ≤360 | ° C. |
| Viscosity at 40° C. | 2.000 ... 4.500 | mm$^2$/s |

In certain embodiments, the fossil diesel component comprises 10-70 wt-%, or 10-50 wt-%, paraffins (n- and i-paraffins), 10-50 wt-% naphthenics, and less than 45 wt-% aromatics of the total weight of the fossil diesel component. Said aromatics may comprise, based on the total weight of the fossil diesel component, 0-30 wt-% monoaromatics, 0-10 wt % diaromatics, and 0-5 wt-% other (poly)aromatics. In certain other embodiments, the fossil diesel component comprises 0-30 wt % monoaromatics, and 0-8 wt-% polyaromatics (including diaromatics) of the total weight of the fossil diesel component.

In certain embodiments, the fossil diesel component comprises 10-70 wt-% paraffins (n- and i-paraffins), 10-50 wt-% naphthenics, and less than 45 wt-% aromatics of the total weight of the fossil diesel component, and has a boiling point range (initial boiling point to end point) as measured according to EN-ISO-3405 (2011) within the temperature range 150-400° C., preferably 180-360° C.

In certain embodiments, the fossil diesel component comprises organic compounds in the range of carbon number C9-C30 at least 90 wt-% of the total weight of the fossil diesel component.

In certain embodiments, the fossil diesel component comprises 10-70 wt-% paraffins (n- and i-paraffins), 10-50 wt-% naphthenics, and less than 45 wt-% aromatics of the total weight of the fossil diesel component, and of the organic compounds comprised in the fossil diesel component at least 90 wt-%, based on the total weight of the fossil diesel component, are in the range of carbon number C9-C30.

The fossil diesel component described in the foregoing may be provided as the fossil diesel component in any aspect and embodiment of the present invention.

The FAME component comprised in the diesel fuel composition of the present invention comprises mainly renewable fatty acid methyl esters, i.e. fatty acid methyl esters derived from a renewable source or renewable sources. In certain embodiments, the FAME component comprises at least 90 wt-% renewable fatty acid methyl esters, preferably at least 95 wt-% renewable fatty acid methyl esters of the total weight of the FAME component. The remaining portion of the FAME component may comprise glycerides, other by-products and/or unreacted starting materials, and/or additives. Preferably, the renewable sources from which the FAME component is derived are renewable oils and/or fats, such as vegetable oils/fats, or animal oils/fats, or a combination thereof. Said renewable oils and/or fats may comprise recycled oils and/or fats. Depending on the fatty acid methyl esters comprised in the FAME component and their origin, the FAME component may also be referred to as "Rape Seed Methyl Esters" (RME), "Soybean Methyl Esters" (SME), "Palm Oil Methyl Esters" (PME), or "Used Cooking Oils Methyl Esters" (UCOME). The FAME component may be a blend of fatty acid methyl esters derived from different renewable sources. Commercially available FAME is often such a blend. The carbon numbers of the fatty acid methyl esters and the ratio of saturated and unsaturated fatty acid methyl esters in the FAME component varies with the raw material or raw materials from which the FAME component has been derived.

In certain embodiments, the FAME component comprises fatty acid methyl esters in the range of carbon number C8-C30 at least 80 wt-% of the total weight of fatty acid methyl esters in the FAME component.

In certain embodiments, the FAME component is a fatty acid methyl esters biodiesel according to standard EN 14214:2019. Table 3 shows some properties of EN 14214: 2019 FAME.

TABLE 3

Some properties of EN 14214:2019 biodiesels.

| Property | | Unit |
|---|---|---|
| Cetane number | ≥51.0 | |
| Density at 15° C. | 860.0 ... 900.0 | kg/m$^3$ |
| Ester content | ≥96.5 | wt-% |
| Sulphur | ≤10.0 | mg/kg |
| Flash point | >101 | ° C. |
| Linolenic acid methyl esters | ≤12 | wt-% |
| Viscosity at 40° C. | 3.500 ... 5.000 | mm$^2$/s |

In embodiments wherein the diesel fuel composition comprises antioxidant, the antioxidant may be provided to the diesel fuel composition in the FAME component. A drawback of fatty acid methyl esters is their poor oxidation stability. Therefore, it may be beneficial to additize the FAME component with antioxidant. Accordingly, in certain embodiments, the FAME component comprises antioxidant, preferably 10-5000 ppm by weight, more preferably 1000 ppm by weight. The FAME component in any embodiment or aspect disclosed herein may be a FAME component comprising antioxidant.

The FAME component described in the foregoing may be provided as the FAME component in any aspect and embodiment of the present invention.

In certain embodiments, the hydrotreated renewable paraffinic diesel component is a hydrotreated renewable paraffinic diesel fuel according to EN 15940:2016, the fossil diesel component is a fossil diesel fuel according to EN 590:2017, and the FAME component is FAME biodiesel according to EN 14214:2019.

In certain embodiments, the FAME component comprises at least 96 wt-% fatty acid methyl esters of the total weight of the FAME component; the hydrotreated renewable paraffinic diesel component comprises at least 95 wt-% paraffins of the total weight of the hydrotreated renewable paraffinic diesel component, of said paraffins of the hydrotreated renewable paraffinic diesel component at least 80 wt-%, preferably at least 90 wt-%, based on the total weight of paraffins in the hydrotreated renewable paraffinic diesel component, are in the range of carbon numbers C15-C18, the weight ratio of i-paraffins to n-paraffins in the renewable paraffinic diesel component being at least 2.2; and the fossil diesel component comprises 10-70 wt-% paraffins, 10-50 wt-% naphthenics, and less than 45 wt-% aromatics of the total weight of the fossil diesel component.

The present invention provides a method for producing a diesel fuel composition, the method comprising providing a hydrotreated renewable paraffinic diesel component, providing a fatty acid methyl esters (FAME) component, providing a fossil diesel component, and mixing the fossil diesel component, the hydrotreated renewable paraffinic diesel component, and the FAME component with each other to form a diesel fuel composition comprising, based on the total diesel fuel composition volume at least 20 vol-%, or 20-68 vol-%, fossil diesel component, 30-70 vol-% hydrotreated renewable paraffinic diesel component, and 2-10 vol-% FAME component. Diesel fuel compositions produced according to said method have favourable oxidation stability properties.

In certain embodiments, the method comprises mixing the fossil diesel component, the hydrotreated renewable paraffinic diesel component, and the FAME component with each other to form a diesel fuel composition comprising, based on the total diesel fuel composition volume, 2-10 vol-% FAME component, and: 30-68 vol-% fossil diesel component and 30-60 vol-% hydrotreated renewable paraffinic diesel component; or 40-68 vol-% fossil diesel component and 30-50 vol-% hydrotreated renewable paraffinic diesel component. Further, in certain embodiments, the method comprises mixing the fossil diesel component, the hydrotreated renewable paraffinic diesel component, and the FAME component with each other to form a diesel fuel composition comprising, based on the total diesel fuel composition volume, 7 vol-% FAME component, and: 23-63 vol-% fossil diesel component and 30-70 vol-% hydrotreated renewable paraffinic diesel component; preferably 33-63 vol-% fossil diesel component and 30-60 vol-% hydrotreated renewable paraffinic diesel component; more preferably 43-63 vol-% fossil diesel component and 30-50 vol-% hydrotreated renewable paraffinic diesel component.

The mixing of the fossil diesel component, the hydrotreated renewable paraffinic diesel component, and the FAME component with each other may in any embodiments be performed such that the total amount of the fossil diesel component, the hydrotreated renewable paraffinic diesel component, and the FAME component is 99 vol-% of the total volume of the formed diesel fuel composition. For example, in certain embodiments, the method comprises mixing the fossil diesel component, the hydrotreated renewable paraffinic diesel component, and the FAME component with each other to form a diesel fuel composition comprising, based on the total diesel fuel composition volume, 2-10 vol-% FAME component, 30-70 vol-%, preferably 30-60 vol-%, more preferably 30-50 vol-% hydrotreated renewable paraffinic diesel component, and fossil diesel component in an amount such that the total amount of the FAME component, the hydrotreated renewable paraffinic diesel component, and the fossil diesel component is at least 99 vol-%. Further, in certain embodiments, the method comprises mixing the fossil diesel component, the hydrotreated renewable paraffinic diesel component, and the FAME component with each other to form a diesel fuel composition comprising, based on the total diesel fuel composition volume, approximately 7 vol-% FAME component, 30-70 vol-%, preferably 30-60 vol-%, more preferably 30-50 vol-% hydrotreated renewable paraffinic diesel component, and fossil diesel component in an amount such that the total amount of the FAME component, the hydrotreated renewable paraffinic diesel component, and the fossil diesel component is at least 99 vol-%.

In certain embodiments, the method comprises mixing the fossil diesel component, the hydrotreated renewable paraffinic diesel component, and the FAME component with each other to form a diesel fuel composition comprising, based on the total diesel fuel composition volume, 2-10 vol-%, preferably 7 vol-%, FAME component, 40-60 vol-% renewable paraffinic diesel component, and 30-58 vol-% fossil diesel component. Further, in certain embodiments, the method comprises mixing the fossil diesel component, the hydrotreated renewable paraffinic diesel component, and the FAME component with each other to form a diesel fuel composition comprising, based on the total diesel fuel composition volume, 2-10 vol-% FAME component, and: 50-70 vol-% hydrotreated renewable paraffinic diesel component and 20-48 vol-% fossil diesel component; preferably 60-70 vol-% hydrotreated renewable paraffinic diesel component and 20-38 vol-% fossil diesel component.

In certain embodiments, the method comprises providing an antioxidant; and mixing the antioxidant with the fossil diesel component, the renewable paraffinic diesel component, and the FAME component to form a diesel fuel composition comprising 10-1000 ppm by weight, preferably 70 ppm by weight antioxidant.

In certain embodiments, providing a hydrotreated renewable paraffinic diesel component comprises providing a feedstock originating from renewable sources (renewable feedstock), the feedstock comprising fatty acids, or fatty acid derivatives, or mono-, di- or triglycerides, or a combination thereof, subjecting said renewable feedstock to hydrotreatment to produce n-paraffins, and optionally subjecting at least a portion of the n-paraffins from the hydrotreatment step to an isomerisation treatment to produce i-paraffins. Hydrotreated renewable paraffinic diesel components provided through hydrotreatment and optional isomerisation of renewable feedstock are particularly suitable for blending with a fossil diesel component and a FAME component to obtain diesel fuel compositions having favourable oxidation stability properties.

Subjecting at least a portion of the n-paraffins to an isomerisation treatment may comprise separating a portion of the n-paraffins obtained in the hydrotreatment step, subjecting said portion to the isomerisation treatment to form i-paraffins and optionally, after the isomerisation treatment, reunifying the separated portion with the n-paraffins it was separated from. Alternatively, the isomerisation step may comprise subjecting all n-paraffins from the hydrotreatment step to an isomerisation treatment.

In certain embodiments, the hydrotreatment step and the optional isomerisation step are conducted in separate reactors, or carried out separately. Optionally, the step of providing the hydrotreated renewable paraffinic diesel component may comprise a purification step and/or a fractionation step. Purification and/or fractionation steps allows better control of the properties of the hydrotreated renewable paraffinic diesel component. Providing the hydrotreated renewable paraffinic diesel component does not comprise gasifying renewable feedstock.

In certain embodiments, the hydrotreatment is performed at a pressure selected from, or varying within, the range 2-15 MPa, preferably 3-10 MPa, and at a temperature selected from, or varying within, the range 200-500° C., preferably 280-400° C. The hydrotreatment may be performed in the presence of known hydrotreatment catalysts containing metals from Group VIII and/or VIB of the Periodic System. Preferably, the hydrotreatment catalysts are supported Pd, Pt, Ni, NiW, NiMo or CoMo catalysts, wherein the support is alumina and/or silica. Typically, $NiMo/Al_2O_3$ and/or $CoMo/Al_2O_3$ catalysts are used. Preferably, the hydrotreatment is hydrodeoxygenation (HDO), or catalytic hydrodeoxygenation (catalytic HDO).

The hydrotreatment typically serves as a deoxygenation, denitrogenation, and desulphurization treatment of the fatty acids, fatty acid derivatives, and/or the glycerides comprised in the renewable feedstock. Further, providing the hydrotreated renewable paraffinic diesel component may comprise subjecting the renewable feedstock to decarboxylation and decarbonylation reactions (i.e. removal of oxygen in the form of $CO_x$), and/or other catalytic processes to: remove oxygen from organic oxygen compounds in the form of water, remove sulphur from organic sulphur compounds in the form of dihydrogen sulphide ($H_2S$), to remove nitrogen from organic nitrogen compounds in the form of ammonia ($NH_3$) and to remove halogens from organic halogen compounds, for example chlorine in the form of hydrochloric acid (HCl). Such processes may be for example hydrodechlorination to remove chlorine and hydrodenitrogenation (HDN) to remove nitrogen.

In certain embodiments, providing the hydrotreated renewable paraffinic diesel component comprises subjecting at least a portion of the n-paraffins from the hydrotreatment step to the isomerisation treatment to form i-paraffins. The isomerisation treatment may be a catalytic isomerisation treatment, such as hydroisomerisation. The isomerisation treatment predominantly serves to provide isoparaffins to the (provided) hydrotreated renewable paraffinic diesel component. Hydrotreatment may result in a minor degree of isomerisation (usually less than 5 wt-%), however, it is the optional isomerisation step that leads to a significant increase in the content of isoparaffins in the hydrotreated renewable paraffinic diesel component. Typically, n-paraffins from the hydrotreatment step subjected to the isomerisation treatment form i-paraffins having predominantly methyl branches. Accordingly, in certain embodiments, the i-paraffins from the isomerisation step comprise one or more methyl branches. The severity of the isomerisation conditions and the choice of catalyst controls the amount of methyl branches formed in the treatment and their distance from each other.

In certain embodiments, the isomerisation treatment is performed at a temperature selected from, or varying within, the range 200-500° C., preferably 280-400° C., and at a pressure selected from, or varying within, the range 2-15 MPa, preferably 3-10 MPa. The isomerisation treatment may be performed in the presence of known isomerisation catalysts, for example catalysts containing a molecular sieve and/or a metal selected from Group VIII of the Periodic Table and a carrier. Preferably, the isomerisation catalyst is a catalyst containing SAPO-11 or SAPO-41 or ZSM-22 or ZSM-23 or ferrierite and Pt, Pd, or Ni and Al2O3 or SiO2. Typically, $Pt/SAPO-11/Al_2O_3$, $Pt/ZSM-22/Al_2O_3$, $Pt/ZSM-23/Al_2O_3$ and/or Pt/SAPO-11/SiO2 are used as catalyst in the isomerisation step (isomerisation treatment). In certain embodiments, the hydrotreatment catalyst(s) and the isomerisation catalyst(s) are not in contact with the reaction feed (the renewable feedstock and/or n-paraffins and/or i-paraffins derived therefrom) at the same time.

The renewable feedstock from which the hydrotreated renewable paraffinic diesel component is derived may comprise vegetable oil, or wood oil, or other plant based oil, or animal oil, or animal fat, or fish fat, or fish oil, or algae oil, or microbial oil, or a combination thereof. Optionally or additionally, the renewable feedstock may comprise recyclable waste and/or recyclable residue. Recyclable waste comprises material such as used cooking oil, free fatty acids, palm oil by-products or process side streams, sludge, and side streams from vegetable oil processing. Preferably, the renewable feedstock comprises at least one of vegetable oil, vegetable fat, animal oil, or animal fat. These materials are preferred, since they allow providing a renewable feedstock having a predictable composition which can be adjusted as needed by appropriate selection and optional blending of the natural oil(s) and/or fat(s). Further, renewable feedstock comprising recyclable waste, or recyclable residues, or both, is preferred, since recyclable waste and/or recyclable residues improve the overall sustainability of the renewable feedstock. Optionally, recyclable waste and/or recyclable residues may be combined with fresh feed of renewable oils and/or renewable fats, such as vegetable oil, vegetable fat, animal oil, and/or animal fat.

The FAME component may be produced through transesterification of renewable oils and/or renewable fats, particularly vegetable oils/fats, animal oils/fats or a combination thereof. Optionally, at least a portion of said renewable fats and/or oils are recycled fats and/or oils, such as waste/used cooking oil. Examples of suitable oils for use as feedstock for fatty acid methyl ester production are palm oil, soya oil, rapeseed oil, sunflower oil, tallow, or combinations thereof.

The renewable oils and/or renewable fats may be reacted with methanol in the presence of a catalyst, for example potassium hydroxide, to produce fatty acid methyl esters. Accordingly, in certain embodiments, providing the FAME component comprises reacting renewable oils or renewable fats or both with methanol, preferably in the presence of a catalyst, to form fatty acid methyl esters.

In certain embodiments, the method comprises providing a FAME component comprising 10-5000 ppm by weight, preferably 1000 ppm by weight, antioxidant.

The diesel fuel composition of the present invention may be used as a heating oil. Particularly, the diesel fuel composition of the present invention may be used as a heating oil in domestic heating systems, industrial heating systems, or both. Examples of domestic heating systems are heating systems for heating buildings, or houses, or garages. Examples of industrial heating systems are heating systems for heating workshops, industrial facilities, premises or workspaces.

The present invention further provides use of a hydrotreated renewable paraffinic diesel component as an oxidation stability enhancer for a fuel composition comprising a fossil diesel component and a fatty acid methyl esters (FAME) component. Yet further, the present invention provides a method comprising improving the oxidation stability of a fuel composition comprising a fossil diesel component and a fatty acid methyl esters (FAME) component, the method comprising adding a hydrotreated renewable paraffinic diesel component to said fuel composition. It has surprisingly been found that the oxidation stability of a fuel composition comprising a fossil diesel component and a fatty acid methyl esters (FAME) component can be improved by addition of a hydrotreated renewable paraffinic diesel component to the fuel composition. The fuel composition of a fossil diesel component and a FAME component may be a diesel fuel.

In certain embodiments, the hydrotreated renewable paraffinic diesel component is added to the fuel composition to form a combined fuel composition comprising 2-10 vol-% FAME component, and: 30-70 vol-% hydrotreated renewable paraffinic diesel component and at least 20 vol-%, or 20-68 vol-%, fossil diesel component; preferably 30-60 vol-% hydrotreated renewable paraffinic diesel component and 30-68 vol-% fossil diesel component; and preferably 30-50 vol-% hydrotreated renewable paraffinic diesel component and 20-48 vol-% fossil diesel component of the total combined fuel composition volume. Further, in certain embodiments, the hydrotreated renewable paraffinic diesel component is added to the fuel composition to form a combined fuel composition comprising 7 vol-% FAME component, and: 30-70 vol-% hydrotreated renewable paraffinic diesel component and 23-63 vol-% fossil diesel component; preferably 30-60 vol-% hydrotreated renewable paraffinic diesel component and 33-63 vol-% fossil diesel component; more preferably 30-50 vol-% hydrotreated renewable paraffinic diesel component and 43-63 vol-% fossil diesel component of the total volume of the combined fuel composition. Incorporating the hydrotreated renewable paraffinic diesel component in such amounts to the fuel composition results in compositions with particularly beneficial oxidation stability properties.

The total amount of the hydrotreated renewable paraffinic diesel component, the FAME component and the fossil diesel component is preferably at least 99 vol-% of the total combined fuel composition volume. In certain embodiments, the fuel composition comprising a fossil diesel component and a FAME component consists essentially of the FAME component and the fossil diesel component. For example, in certain embodiments, the hydrotreated renewable paraffinic diesel component is added to the fuel composition to form a combined fuel composition comprising, based on the total combined fuel composition volume, 2-10 vol-% FAME component, 30-70 vol-%, preferably 30-60 vol-%, more preferably 30-50 vol-% hydrotreated renewable paraffinic diesel component, and fossil diesel component in an amount such that the total amount of the FAME component, the hydrotreated renewable paraffinic diesel component, and the fossil diesel component is at least 99 vol-%. Further, the hydrotreated renewable paraffinic diesel component is added to the fuel composition to form a combined fuel composition comprising, based on the total fuel composition volume, approximately 7 vol-% FAME component, 30-70 vol-%, preferably 30-60 vol-%, more preferably 30-50 vol-% hydrotreated renewable paraffinic diesel component, and fossil diesel component in an amount such that the total amount of the FAME component, the hydrotreated renewable paraffinic diesel component, and the fossil diesel component is at least 99 vol-%

In certain embodiments, the hydrotreated renewable paraffinic diesel component is added to a fuel composition consisting essentially the FAME component and the fossil diesel component to form a combined fuel composition comprising 40-60 vol-%, or 50-70 vol-%, or 60-70 vol-% hydrotreated renewable paraffinic diesel component of the total combined fuel composition volume. In certain embodiments, the hydrotreated renewable paraffinic diesel component is added to the fuel composition to form a combined fuel composition comprising 2-10 vol-%, preferably 7 vol-%, FAME component, 40-60 vol-% renewable paraffinic diesel component, and 30-58 vol-% fossil diesel component of the total combined fuel composition volume. Further, in certain embodiments, the hydrotreated renewable paraffinic diesel component is added to the fuel composition to form a combined fuel composition comprising 2-10 vol-% FAME component, and: 50-70 vol-% hydrotreated renewable paraffinic diesel component and 20-48 vol-% fossil diesel component; or 60-70 vol-% hydrotreated renewable paraffinic diesel component and 20-38 vol-% fossil diesel component of the total combined fuel composition volume.

The following clauses are provided to illustrate certain aspects and embodiments of the invention.

1. (Alternative first aspect) A diesel fuel composition comprising:
   a. a fossil diesel component at least 20 vol-%-%, or 20-68 vol-%, of the total diesel fuel composition volume, the fossil diesel component having a boiling point range 150-400° C. measured according to EN-ISO-3405: 2011;
   b. a fatty acid methyl esters (FAME) component 2-10 vol-% of the total diesel fuel composition volume;
   c. a hydrotreated renewable paraffinic diesel component 30-70 vol-% of the total diesel fuel composition volume, wherein the hydrotreated renewable paraffinic diesel component comprises at least 70 wt-% paraffins in the range of carbon number C15-C18 of the total weight of paraffins in the hydrotreated renewable paraffinic diesel component; and
   d. antioxidant 10-1000 ppm by weight of the diesel fuel composition weight;
   wherein the total amount of the fossil diesel component, the FAME component, and the hydrotreated renewable paraffinic diesel component is at least 99 vol-% of the total diesel fuel composition volume.

2. The diesel fuel composition according to clause 1, comprising hydrotreated renewable paraffinic diesel component 30-60 vol-%, preferably 30-50 vol-% of the total diesel fuel composition volume.

3. The diesel fuel composition according to any of the preceding clauses, comprising fossil diesel component at least 30 vol-%, preferably at least 40 vol-% of the total diesel fuel composition volume.

4. The diesel fuel composition according to any of the preceding clauses, wherein the hydrotreated renewable paraffinic diesel component comprises paraffins at least 90 wt-%, preferably at least 95 wt-%, more preferably at least 98 wt-%, even more preferably at least 99 wt-% of the total weight of the hydrotreated renewable paraffinic diesel component.

5. The diesel fuel composition according to any of the preceding clauses, wherein the hydrotreated renewable paraffinic diesel component comprises naphthenes at most 5.0 wt-%, preferably at most 2.0 wt-%, of the total weight of the hydrotreated renewable paraffinic diesel component.

6. The diesel fuel composition according to any of the preceding clauses, wherein the hydrotreated renewable paraffinic diesel component comprises paraffins in the range of carbon number C15-C18 at least 80 wt-%, more preferably at least 90 wt-% of the total weight of paraffins in the hydrotreated renewable paraffinic diesel component.

7. The diesel fuel composition according to any of the preceding clauses, wherein the hydrotreated renewable paraffinic diesel component comprises i-paraffins and n-paraffins in a weight ratio of i-paraffins to n-paraffins of at least 2.2, preferably at least 2,3, more preferably at least 3, even more preferably at least 4.

8. The diesel fuel composition according to any of the preceding clauses, wherein the fossil diesel component is fossil middle distillate originating from non-renewable sources and having a boiling point range within the temperature range from 180 to 360° C.

9. The diesel fuel composition according to any of the preceding clauses, wherein the fossil diesel component comprises 10-50 wt-% naphthenics, less than 45 wt-% aromatics, and 10-70 wt-% paraffins of the total weight of the fossil diesel component.

10. The diesel fuel composition according to any of the preceding clauses, comprising antioxidant 70 ppm by weight.

11. (Alternative second aspect) A method for producing a diesel fuel composition according to clause 1, comprising:
providing a fossil diesel component;
providing a hydrotreated renewable paraffinic diesel component;
providing a fatty acid methyl esters (FAME) component;
providing an antioxidant; and
mixing the fossil diesel component, the hydrotreated renewable paraffinic diesel component, the FAME component, and the antioxidant with each other to form a diesel fuel composition comprising, based on the total diesel composition volume, at least 20 vol-%, or 20-68 vol-%, fossil diesel component, the fossil diesel component having a boiling point range 150-400° C. measured according to EN-ISO-3405:2011; 30-70 vol-% hydrotreated renewable paraffinic diesel component, wherein the hydrotreated renewable paraffinic diesel component comprises at least 70 wt-% paraffins in the range of carbon number C15-C18 of the total weight of paraffins in the hydrotreated renewable paraffinic diesel component; 2 vol-%-10 vol-% FAME component; and antioxidant 10-1000 ppm by weight of the diesel fuel composition weight.

12. The method according to clause 11, wherein providing a hydrotreated renewable paraffinic diesel component comprises:
i. providing a feedstock originating from renewable sources, the feedstock comprising fatty acids, or fatty acid derivatives, or triglycerides, or a combination thereof;
ii. subjecting the feedstock to hydrotreatment, preferably hydrodeoxygenation, to produce n-paraffins; and optionally
iii. subjecting at least a portion of the n-paraffins from step ii) to an isomerisation treatment to produce i-paraffins.

13. The method according to clause 11 or 12, comprising mixing the antioxidant with the fossil diesel component, the renewable paraffinic diesel component, and the FAME component to form a diesel fuel composition comprising 70 ppm by weight, antioxidant.

14. The method according to any of the preceding clauses 11 or 12, comprising providing a FAME component comprising 10-5000 ppm by weight, preferably 1000 ppm by weight, antioxidant.

15. (Alternative third aspect) Use of a diesel fuel composition according to any of the preceding clauses 1 to 10 as a fuel for a diesel engine.

16. (Alternative fourth aspect) Use of a diesel fuel composition according to any of the preceding clauses 1 to 10 as a heating oil.

EXAMPLES

The following examples are provided to better illustrate the claimed invention and are not to be interpreted as limiting the scope of the invention. To the extent that specific materials are mentioned, it is merely for purposes of illustration and is not intended to limit the invention.

The oxidation stability of diesel fuel compositions comprising fossil diesel fuel according to standard EN 590:2017 (FD) as fossil diesel component, fatty acid methyl esters biodiesel according to standard EN 14214:2019 (FAME) either with or without antioxidant as FAME component, and hydrotreated renewable diesel fuel according to standard EN 15940:2016 (RD) as hydrotreated renewable paraffinic diesel component was studied. Further, the oxidation stability of 100 vol-% RD, and of blends comprising 7 vol-% FAME and 93 vol-% FD was measured. Said blends of 7 vol-% FAME and 93 vol-% FD correspond to conventional EN590: B7 diesel fuels, i.e. blends with 93 vol-% fossil diesel fuel according to EN 590:2017 and 7 vol-% FAME biodiesel according to EN 14214:2019. 7 vol-% is the maximum amount of FAME allowed in diesel fuels according to EN 590:2017. The vol-% of these examples are expressed as vol-% of the total volume of the blend.

Two different batches of each diesel component were provided; FAME 1, FAME 2, FD 1, FD 2, RD 1, and RD 2. The fossil diesel fuel batches FD 1 and FD 2 were both fossil diesel according to EN 590:2017 and the renewable diesel batches RD 1 and RD 2 were both hydrotreated renewable diesel according to EN 15940:2016. FAME 1 was additized with antioxidant and comprised antioxidant 1000 ppm by weight, whereas FAME 2 did not contain antioxidant. A first set of blends was formed by combining FAME 1, FD 1 and RD 1, and a second set of blends was formed by combining FAME 2, FD 2 and RD 2. The studied diesel fuel compositions are described in Tables 4 and 5. The first set of blends is described in Table 4, and the second set of blends is described in Table 5. All blends of FAME, FD and RD for which the oxidation stability was measured contained 7 vol-% FAME, whereas the amount of FD was varied within the range 43-83 vol-%, and the amount of RD was varied within the range 10-50 vol-%. Blends comprising 7 vol-% FAME 1 contained antioxidant 70 ppm by weight.

The oxidation stability of the blends described in Tables 4 and 5 was measured with the PetroOXY method according to EN 16091:2011. In the PetroOXY method a sample is pressurized with oxygen at 700 kPa and at a temperature of 140° C. Oxygen is consumed during oxidation of the sample and the breakpoint is when the oxygen pressure drops 10% from the maximum observed oxygen pressure. The results are given in minutes elapsed from the measurement starting point to the breakpoint. The longer the time between the starting point and the breakpoint, the better is the oxidation stability of the sample. There is a correlation of PertoOXY with Rancimat (EN 15751:2014) when the sample contains FAME (more than 2 vol-%). Rancimat results of 20 h correspond to about 54-62 minutes in PetroOXY. Thus, PetroOXY values higher than 54 minutes may be considered reasonable.

The measured PetroOXY values for the first set of blends and for the second set of blends are shown in Tables 4 and 5, respectively.

TABLE 4

Diesel fuel blends of FAME 1, FD 1, and RD 1 and their oxidation stability measured according to PetroOXY. FAME 1 comprises antioxidant.

| Diesel fuel composition | PetroOXY (min) |
| --- | --- |
| 7 vol-% FAME 1 + 93 vol-% FD 1 | 93 |
| 7 vol-% FAME 1 + 83 vol-% FD 1 + 10 vol-% RD 1 | 101 |
| 7 vol-% FAME 1 + 63 vol-% FD 1 + 30 vol-% RD 1 | 105 |
| 7 vol-% FAME 1 + 43 vol-% FD 1 + 50 vol-% RD 1 | 113 |
| 100 vol-% RD 1 | 67 |

TABLE 5

Diesel fuel blends of FAME 2, FD 2, and RD 2 and their oxidation stability measured according to PetroOXY. FAME 2 does not comprise antioxidant.

| Diesel fuel composition | PetroOXY (min) |
| --- | --- |
| 7 vol-% FAME 2 + 93 vol-% FD 2 | 59 |
| 7 vol-% FAME 2 + 83 vol-% FD 2 + 10 vol-% RD 2 | 62 |
| 7 vol-% FAME 2 + 63 vol-% FD 2 + 30 vol-% RD 2 | 65 |
| 7 vol-% FAME 2 + 43 vol-% FD 2 + 50 vol-% RD 2 | 69 |
| 100 vol-% RD 2 | 64 |

Figure 1:
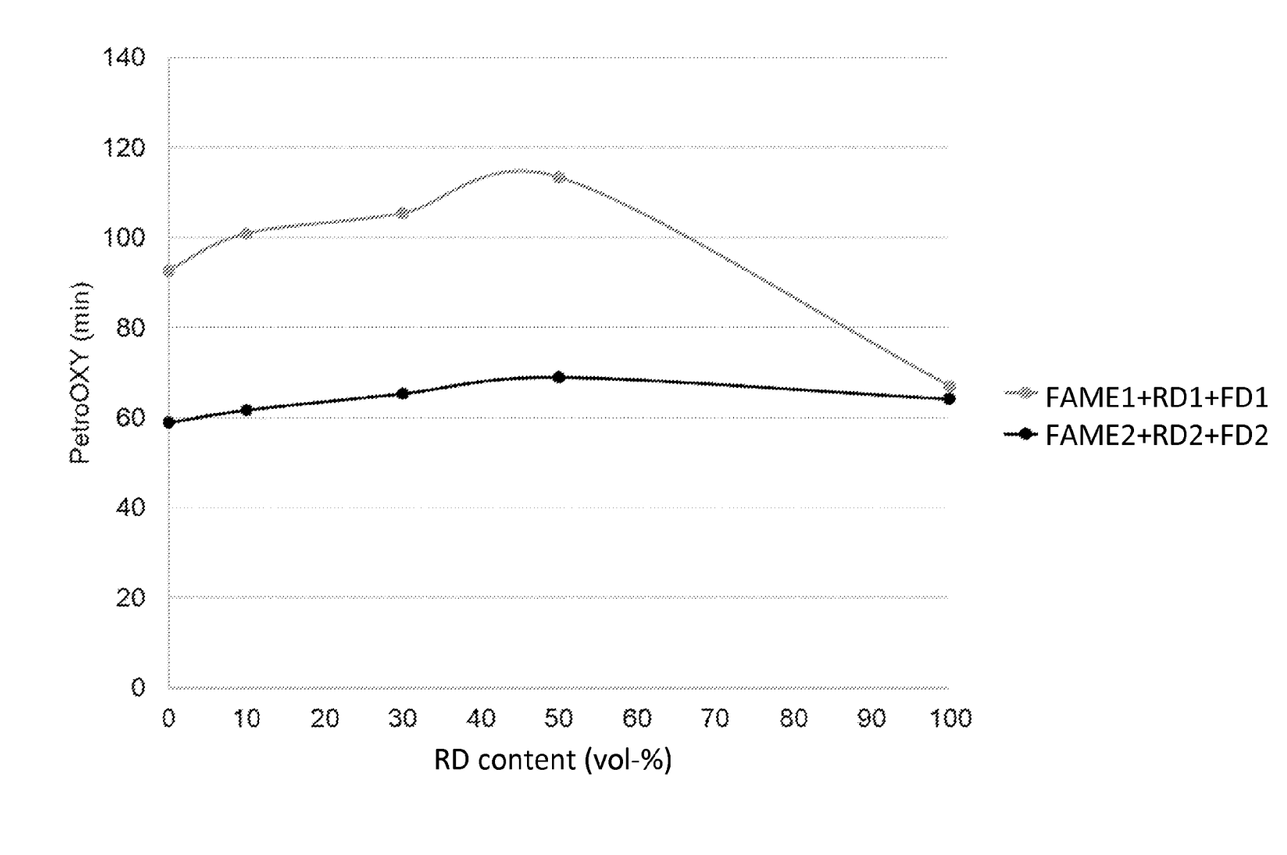
FIG. 1 shows a graph presenting measured PetroOXY oxidation stability values of diesel fuel compositions comprising a fossil diesel component (FD), a FAME component and a hydrotreated renewable paraffinic diesel component (RD). The PetroOXY values are plotted as a function of vol-%, based on the total diesel fuel composition volume, of the hydrotreated renewable paraffinic diesel component in the diesel fuel composition. Based on the measured values, the plots have been extrapolated over the full range from 0 vol-% to 100 vol-% hydrotreated renewable paraffinic diesel component such that as the vol-% of hydrotreated renewable paraffinic diesel component in the diesel fuel compositions increases the vol-% of the fossil diesel component decreases. The grey line and dots represent a first set of blends wherein the FAME component comprises antioxidant; and the black line and dots represent a second set of blends wherein the FAME component, and the diesel fuel composition as a whole, does not comprise antioxidant.

The measured PetroOxy values of Tables 4 and 5 are plotted in FIG. 1 as a function of the vol-% of RD in the blend. Based on the measured values, the plots have been extrapolated over the full range from 0 vol-% to 100 vol-% RD such that FD is increasingly replaced by RD in the blends. The grey line and dots represent the first set of blends comprising FAME 1, i.e. a FAME component comprising antioxidant. The black line and dots represent the second set of blends comprising FAME 2, i.e. a FAME component without antioxidant (and consequently diesel fuel compositions without antioxidant).

As seen in Tables 4 and 5, replacing FD with RD in the blend while keeping the vol-% of FAME constant at 7 vol-% improves the oxidation stability of the formed blends. Particularly good oxidation stability was observed for blends comprising 30 vol-% and 50 vol-% RD.

Surprisingly, as seen in FIG. 1, blends comprising at least 30 vol-% and up to around 70 vol-% RD had an oxidation stability exceeding the oxidation stability of the corresponding blend of 93 vol-% FD and 7 vol-% FAME and the oxidation stability of the corresponding neat RD. Accordingly, sufficient oxidation stability of blends comprising FAME and FD can be achieved without additization with antioxidant by replacing FD with RD such that the blend contains at least 30 and up to around 70 vol-% RD.

As seen in FIG. 1 and Tables 4 and 5, increasing the amount of RD (thus reducing the amount of FD while keeping the vol-% of FAME constant) from 30 vol-% to 50 vol-% further improved the oxidation stability. For example, it may be derived from FIG. 1 that increasing the amount of RD 2 in the blend of FAME 2, FD 2 and RD 2 from 30 vol-% to 40 vol-% raises the increase in the oxidation stability by almost a third when compared to the blend of 93 vol-% FD 2 and 7 vol-% FAME 2.

As shown in Table 4, the oxidation stability of the blend comprising 7 vol-% FAME 1 (additized with antioxidant) and 93 vol-% FD 1 was higher than that of neat RD 1 (without antioxidant). However, it was surprisingly found that replacing FD with RD in said blend improved the oxidation stability of the formed blends despite the lower oxidation stability of neat RD 1 compared to the 7 vol-% FAME 1+93 vol-% FD 1 blend.

Comparing the results in Table 4 with those in Table 5, it can be seen that the improvement of the oxidation stability upon replacement of FD with RD was particularly pronounced for blends containing FAME 1, i.e. a FAME component additized with antioxidant. The improvement in the oxidation stability was particularly pronounced when the vol-% of the renewable diesel component was increased from 10 vol-% to 30 vol-%, and further to 50 vol-%. Accordingly, the blend comprising 7 vol-% FAME 1, 43 vol-% FD 1, and 50 vol-% RD 1 had the most favourable oxidation stability of the blends in Tables 4 and 5.

Standard EN 590:2017 allows FAME up to 7 vol-% of the total diesel fuel volume whereas the vol-% of hydrotreated renewable paraffinic diesel is not limited by EN 590:2017. Thus, blends comprising 7 vol-% FAME, 30-70 vol-% RD and 23-63 vol-% FD fulfil the requirements of EN 590:2017 and can be provided commercially without violating the current standard. Further, replacing FD in the blends with RD increases the amount of renewable components in the blend compared to conventional EN 590:B7 diesel fuels comprising 7 vol-% FAME and 93 vol-% fossil diesel fuel.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A diesel fuel composition comprising:
   a. a fossil diesel component at least 20 vol-% of a total diesel fuel composition volume, the fossil diesel component having a boiling point range within a temperature range 150-400° C. measured according to EN-ISO-3405:2011;
   b. a fatty acid methyl esters (FAME) component 2-10 vol-% of the total diesel fuel composition volume;
   c. a hydrotreated renewable paraffinic diesel component 30-70 vol-% of the total diesel fuel composition volume, the hydrotreated renewable paraffinic diesel component containing at least 70 wt-% paraffins in a range of carbon number C15-C18 of a total weight of paraffins in the hydrotreated renewable paraffinic diesel component; and
   d. antioxidant 10-1000 ppm by weight of the diesel fuel composition weight;
   wherein a total amount of the fossil diesel component, the FAME component, and the hydrotreated renewable paraffinic diesel component is at least 99 vol-% of the total diesel fuel composition volume, and wherein the diesel fuel composition has an oxidation stability of 105 min or more as measured according to EN 16091:2011.

2. The diesel fuel composition according to claim 1, comprising:
hydrotreated renewable paraffinic diesel component 30-60 vol-% of the total diesel fuel composition volume.

3. The diesel fuel composition according to claim 1, comprising:
fossil diesel component at least 30 vol-% of the total diesel fuel composition volume.

4. The diesel fuel composition according to claim 1, wherein the hydrotreated renewable paraffinic diesel component comprises:
paraffins at least 90 wt-% of the total weight of the hydrotreated renewable paraffinic diesel component.

5. The diesel fuel composition according to claim 1, wherein the hydrotreated renewable paraffinic diesel component comprises:
naphthenes at most 5.0 wt-% of the total weight of the hydrotreated renewable paraffinic diesel component.

6. The diesel fuel composition according to claim 1, wherein the hydrotreated renewable paraffinic diesel component comprises:
paraffins in a range of carbon number C15-C18 at least 80 wt-% of the total weight of paraffins in the hydrotreated renewable paraffinic diesel component.

7. The diesel fuel composition according to claim 1, wherein the hydrotreated renewable paraffinic diesel component comprises:
i-paraffins and n-paraffins in a weight ratio of i-paraffins to n-paraffins of at least 2.2.

8. The diesel fuel composition according to claim 1, wherein the fossil diesel component is fossil middle distillate originating from non-renewable sources and having a boiling point range within a temperature range from 180 to 360° C.

9. The diesel fuel composition according to claim 1, wherein the fossil diesel component comprises:
10-50 wt-% naphthenics, less than 45 wt-% aromatics, and 10-70 wt-% paraffins of a total weight of the fossil diesel component.

10. The diesel fuel composition according to claim 1, comprising:
antioxidant 70 ppm by weight.

11. A method for producing a diesel fuel composition the method comprising:
providing a fossil diesel component;
providing a hydrotreated renewable paraffinic diesel component;
providing a fatty acid methyl esters (FAME) component;
providing an antioxidant; and
mixing the fossil diesel component, the hydrotreated renewable paraffinic diesel component, the FAME component, and the antioxidant with each other to form a diesel fuel composition containing, based on a total diesel composition volume, at least 20 vol-% fossil diesel component, the fossil diesel component having a boiling point range within a temperature range 150-400° C. measured according to EN-ISO-3405:2011; 30-70 vol-% hydrotreated renewable paraffinic diesel component, wherein the hydrotreated renewable paraffinic diesel component contains at least 70 wt-% paraffins in a range of carbon number C15-C18 of the total weight of paraffins in the hydrotreated renewable paraffinic diesel component; 2 vol-%-10 vol-% FAME component; and antioxidant 10-1000 ppm by weight of a diesel fuel composition weight, wherein the diesel fuel composition has an oxidation stability of 105 min or more as measured according to EN 16091:2011.

12. The method according to claim 11, wherein providing a hydrotreated renewable paraffinic diesel component comprises:
i. providing a feedstock originating from renewable sources, the feedstock containing fatty acids, or fatty acid derivatives, or triglycerides, or a combination thereof;
ii. subjecting the feedstock to hydrotreatment to produce n-paraffins; and
optionally;
iii. subjecting at least a portion of the n-paraffins from step ii) to an isomerisation treatment to produce i-paraffins.

13. The method according to claim 11 comprising:
mixing the antioxidant with the fossil diesel component, the renewable paraffinic diesel component, and the FAME component to form a diesel fuel composition containing 70 ppm by weight antioxidant.

14. The method according to claim 11, wherein the provided FAME component comprises:
10-5000 ppm by weight antioxidant.

15. A method of producing a diesel fuel composition according to claim 1, the method comprising:
producing the diesel fuel composition as a heating oil.

16. A method to improve oxidation stability of a fuel composition containing a fossil diesel component and a fatty acid methyl esters (FAME) component the method comprising:
adding an oxidation stability improver as a hydrotreated renewable paraffinic diesel component to the fuel composition to form a combined fuel composition containing 30-70 vol-% renewable paraffinic diesel component of a total combined fuel composition volume.

17. The method according to claim 16, wherein the hydrotreated renewable paraffinic diesel component comprises:
at least 70 wt-% paraffins in a range of carbon number C15-C18 of a total weight of paraffins in the hydrotreated renewable paraffinic diesel component.

18. The method according to claim 16, wherein the combined fuel composition has a higher oxidation stability measured according to EN 16091:2011 compared to the components of the combined diesel fuel composition.

19. The method according to claim 16, wherein the combined fuel composition comprises:
at least 20 vol-% fossil diesel component; and
2-10 vol-% FAME component of the total combined fuel composition volume.

20. The method according to claim 16, wherein the total amount of the fossil diesel component, the FAME component, and the hydrotreated renewable paraffinic diesel component is at least 99 vol-% of the total combined diesel fuel composition volume.

21. The method according to claim 16, comprising:
adding an antioxidant 10-1000 ppm by weight.

22. The method according to claim 16, comprising:
wherein the combined fuel composition comprises antioxidant 10-1000 ppm by weight.

23. A method of improving oxidation stability of a fuel composition to form the diesel fuel composition according to claim 1, comprising:
adding a hydrotreated renewable paraffinic diesel component containing at least 70 wt-% paraffins in a range of carbon number C15-C18 of the total weight of paraffins in the hydrotreated renewable paraffinic diesel component, to the fuel composition containing:
- a. a fossil diesel component having a boiling point range within a temperature range 150-400° C. measured according to EN-ISO-3405:2011;
- b. a fatty acid methyl esters (FAME) component; and
- d. antioxidant;

wherein the diesel fuel composition contains 30-70 vol-% renewable paraffinic diesel component of the total combined fuel composition volume, at least 20 vol-% of the fossil diesel component, 2-10 vol-% of the FAME component, 10-1000 ppm of the antioxidant, the total amount of the fossil diesel component, the FAME component, and the hydrotreated renewable paraffinic diesel component being at least 99 vol-% of the total combined fuel composition volume; and wherein the diesel fuel composition has an oxidation stability of 105 min or more as measured according to EN 16091:2011.

24. The method according to claim 23, wherein adding the hydrotreated renewable paraffinic diesel component improves oxidation stability as measured according to EN 16091:2011, and/or the diesel fuel composition has a higher oxidation stability as measured according to EN 16091:2011 compared to the components of the diesel fuel composition.

25. The method according to claim 23, wherein the antioxidant is 2,6-di-tert-butyl-1,4-hyrdoxytoluene (BHT).

26. The method according to claim 23, wherein the diesel fuel composition comprises antioxidant 70 ppm by weight.

27. The diesel fuel composition according to claim 1, wherein the antioxidant is 2,6-di-tert-butyl-1,4-hyrdoxytoluene (BHT).

* * * * *